Jan. 25, 1966     H. A. VANDER KAAY ETAL     3,231,790
MANUAL ARMATURE ACTUATING MEANS FOR A VALVE SOLENOID
Filed Nov. 21, 1962
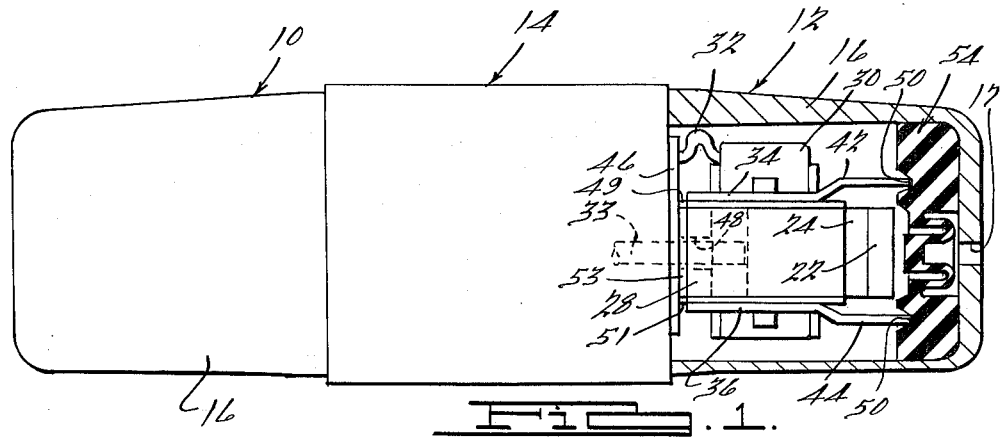
FIG. 1.
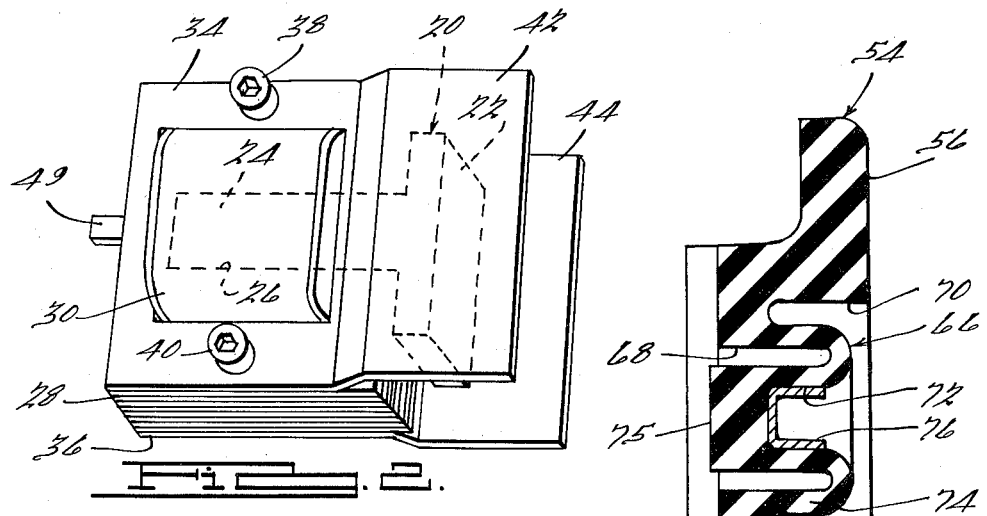
FIG. 2.
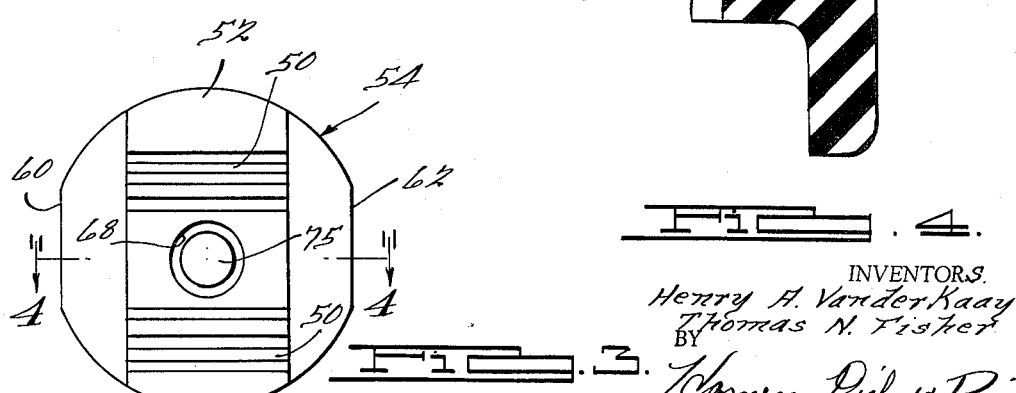
FIG. 4.
FIG. 3.
INVENTORS.
Henry A. VanderKaay.
Thomas N. Fisher
BY
Harness, Dickey & Pierce
ATTORNEYS

United States Patent Office 3,231,790
Patented Jan. 25, 1966

3,231,790
MANUAL ARMATURE ACTUATING MEANS FOR A VALVE SOLENOID
Henry A. Vander Kaay, Ann Arbor, and Thomas N. Fisher, Saline, Mich., assignors to Double A Products Co., Manchester, Mich., a corporation of Michigan
Filed Nov. 21, 1962, Ser. No. 239,210
8 Claims. (Cl. 317—175)

The present invention relates to solenoids and more particularly to solenoid actuator means.

As is well known in the art, it is often desirable to provide means in association with a solenoid unit for manually actuating the armature thereof independently of electrical energization of the coil thereof. Such manual actuating means preferably include, particularly in the case of fully sealed solenoids, means for preventing the entrance of foreign matter such as water, dust or the like internally of the solenoid unit while providing ready access to the armature. Conventionally, such means is in the form of an accurately machined bore in the solenoid housing, an accurately machined pin or plunger slidably received therein and a groove in one with an O-ring therein for sealing. Such an arrangement, however, in addition to being relatively complex and expensive, suffers from the disadvantages that eventually foreign particles leak in and/or any internal fluid leaks out, and that once the plunger is pushed inwardly it so remains and thus constitutes an additional load on the return mechanism of the solenoid unit.

It is therefore a primary object of the present invention, to provide novel improved means for manually actuating the armature of a solenoid, which means is not subject to any of the aforesaid disadvantages in that it is extremely simple and inexpensive and returns automatically, and which provides little opportunity for accidental actuation, has minimum operating friction, and incorporates nothing which will stick, bind or corrode.

Another object resides in the provision of unique improved actuator means which also serves as resilient mounting means for the solenoid and sealing means for the entire solenoid unit.

These and other objects will become apparent upon consideration of the following description taken in conjunction with the accompanying drawing, throughout the several views of which corresponding reference characters are used to designate corresponding parts, and in which:

FIGURE 1 is an elevational view, partially in section, of a solenoid unit having actuator means embodying the principles of the present invention, shown for exemplary purposes only in conjunction with a four-way valve adapted to be actuated thereby;

FIGURE 2 is an enlarged view in perspective of one type of solenoid unit adapted to be associated with the solenoid actuator means of the present invention;

FIGURE 3 is an elevational view of the inside face of the solenoid actuator means shown in FIGURE 1; and FIGURE 4 is an enlarged vertical sectional view taken along the line 4—4 in FIGURE 3.

Referring now to FIGURE 1 of the drawings, a pair of solenoid units, indicated at 10 and 12, are representatively illustrated as being operatively associated with a conventional four-way valve 14. Each of the solenoid units includes a protective cover or housing 16 connected to the housing of the valve 14 by any suitable fastening means and having an axial opening 17 through which the solenoid therein may be manually actuated. For purposes of this specification, the term "solenoid unit" is used with reference to a fully operative unit including a core, an armature, a coil, means for the energization thereof and whatever else is conventionally present in an operating unit.

More particularly, in FIGURES 1 and 2 of the illustrated embodiment, solenoid unit 12 includes a generally T-shaped armature 20 having a cross-head 22 and an elongated leg portion 24 extending through an opening 26 extending longitudinally through a core 28 that carries a coil 30 electrically connected to a suitable power source (not shown) by means of a conductor 32 for controlling the movement of armature 20 relative to core 28 in accordance with the electrical energization thereof. The end of elongated leg 24 opposite head 22 is adapted to be connected to or abut a valve actuator pin 33, which may actually be simply an extension of the valve spool, in a conventional fashion to operate valve 14 (not shown).

The solenoid unit is further illustrated as including a pair of spaced mounting plates 34 and 36 connected on both sides of the core 28 by means of suitable fasteners, representatively illustrated as cap screws 38 and 40. Spaced mounting plates 34 and 36 extend from one end of core 28 and are offset outwardly to form end portions 42 and 44. As can be seen, these end portions are located at spaced positions on either side of armature head 22 to enable it to move freely.

These above-described operative parts of solenoid unit 12 are mounted relative to valve 14 by supporting the left hand end of core 28, as seen in FIGURE 1, to the outer wall of the valve 14 by means of a suitable locating element 46 having an appropriate opening therein through which projects actuator pin 33 into housing 16 and through an opening 48 in the core to the end of plunger 20. This end of the solenoid unit is located and maintained against transverse movement with respect to pin 33 by means of a pair of projections 49 and 51 extending from the core into suitable properly located openings in locating element 46. In addition, a resilient washer-like member 53 may be provided between element 46 and the core to assist in the cushioning of the entire unit.

The opposite end of the solenoid unit is held in its operative position by the engagement of the mounting plate end portions 42 and 44 with grooves 50 formed transversely in the inside face 52 of a unitary resilient member 54. This resilient member may be formed of any suitable material, such as rubber or the like, having a hardness of 40–60 durometers for example, and is of a configuration best shown in FIGURES 3 and 4. Opposite inside face 52, resilient member 54 is provided with an outer face 56 of substantially the same configuration as the inner surface of the end of housing 16 against which it is adapted to snugly fit. As can be seen in FIGURE 3, it is substantially circular in plan with a pair of flat land portions 60 and 62 formed on diametrically opposite sides thereof to prevent rotation thereof relative to the housing 16 which is provided with mating projections.

Resilient member 54 should be sufficiently thick so that it is compressed somewhat between the solenoid and the housing and outer face 56 will be maintained in a sealing relationship with the inner surface of the housing. Thus, member 54 not only serves as a resilient cushion for the solenoid but it also serves as an inside of housing 16 and opening 17 therein, to prevent the entrance of foreign matter such as water, dust or the like which might interfere with the operation of the solenoid or cause corrosion.

Also in accordance with the principles of the present invention, member 54 further serves as a unique manual actuator device which eleminates the need for the close tolerance openings and expensive sealing arrangements heretofore present in manual solenoid actuators. For this purpose member 54 is provided with a telescoping diaphragm 66 located centrally thereof and integrally formed therewith, including a first annular recess 68 formed in inner face 52 and a second larger annular recess 70 formed in outer face 56, both of the recesses being concentrically arranged with respect to opening 17 in housing 16. Telescoping diaphragm 66 further includes an axial blind hole 72 in outer face 56. These recesses and blind hole serve to create an annular convolution 74 in the member, the inside center portion 75 of which is displaceable in an axial direction, i.e., in a direction transverse to the plane of the faces of the member.

As can be seen, convolution 74 has a relaxed configuration such that surface portion 75 normally does not interfere with the operation of solenoid unit 12. However, it has sufficient flexibility and resiliency so that an external pin or other suitable tool (not shown) can be directed through opening 17 in the housing end wall into engagement with the inner surface of the bottom of blind hole 72 to cause portion 75 to move inwardly into engagement with head 22 of armature 20 for manually actuating the armature.

After the solenoid has been manually actuated, convolution 74 will automatically return portion 75 to its relaxed position out of engagement with the armature so that the latter can then be electrically energized without any possibility of the manual actuator creating interference.

If desired, blind hole 72 may be provided with a cup-like member 76, as shown in FIGURE 4, formed of a suitable wear-resistant material to prevent excessive wear between the external actuating pin or tool and the telescoping diaphragm portion of member 54.

Thus, there is disclosed in the above description and in the drawings an exemplary embodiment of the invention which fully and effectively accomplishes the objects thereof. However, it will be apparent that variations in the details of construction may be indulged in without departing from the sphere of the invention herein described, or the scope of the appended claims.

What is claimed is:

1. A solenoid unit assembly comprising a housing having an opening at one end thereof, a solenoid unit contained within said housing having solenoid means and mounting means thereon for supporting said solenoid means within said housing and means for sealing said housing and manually actuating said solenoid unit including a resilient member disposed in sealing engagement with said one end of said housing having a portion thereof overlying said opening, said opening being adapted to receive a manual actuating tool inserted therein and into engagement with said overlying portion, said overlying portion being displaceable axially of said opening into engagement with said solenoid unit to manually actuate the latter, said resilient member including means engaging said mounting means for resiliently supporting said solenoid unit in said housing.

2. A solenoid unit assembly comprising a housing having an opening at one end thereof, a solenoid unit contained within said housing having solenoid means and mounting means thereon for supporting said solenoid means within said housing and means for sealing said housing and manually actuating said solenoid unit including a resilient member disposed in sealing engagement with said one end of said housing having a portion thereof overlying said opening, said opening being adapted to receive a manual actuating tool inserted therein and into engagement with said overlying portion, said overlying portion being displaceable axially of said opening into engagement with said solenoid unit to manually actuate the latter, said resilient member including means engaging said mounting means for resiliently supporting said solenoid unit in said housing in both generally axial and transverse directions with respect to said resilient member.

3. The assembly of claim 2 wherein said mounting means includes end portions and said resilient member engaging means includes grooves formed in said resilient member, said end portions being received in said grooves to provide said axial and transverse support.

4. A solenoid unit assembly comprising a housing having an opening at one end thereof, a solenoid unit contained within said housing having solenoid means and mounting means thereon for supporting said solenoid means within said housing and means for sealing said housing and manually actuating said solenoid unit including a resilient member disposed in sealing engagement with said one end of said housing having a portion thereof overlying said opening, said opening being adapted to receive a manual actuating tool inserted therein and into engagement with said overlying portion, said overlying portion being displaceable axially of said opening into engagement with said solenoid unit to manually actuate the latter, said resilient member including means engaging said mounting means and compressed between said mounting means and said one end of said housing for resiliently supporting and cushioning said solenoid unit in said housing.

5. A solenoid unit assembly comprising a housing having an opening at one end thereof, a solenoid unit contained within said housing having solenoid means and mounting means thereon for supporting said solenoid means within said housing and means for sealing said housing and manually actuating said solenoid unit including a resilient member disposed in sealing engagement with said one end of said housing having a portion thereof overlying said opening, wear resistant means supported on said portion in axial alignment with said opening, said opening being adapted to receive a manual actuating tool inserted therein and into engagement with said wear resistant means, said overlying portion being displaceable axially of said opening into engagement with said solenoid unit to manually actuate the latter, said resilient member including means engaging said mounting means for resiliently supporting said solenoid unit in said housing.

6. A solenoid unit assembly comprising a housing having an opening at one end thereof, a solenoid unit contained within said housing having solenoid means and mounting means thereon for supporting said solenoid unit within said housing and means for sealing said housing and manually actuating said solenoid unit including a one-piece, impervious, resilient member disposed in sealing engagement with said one end of said housing having an integral portion thereof overlying said opening and normally spaced from said solenoid means, said opening being adapted to receive a manual actuating tool inserted therein and into engagement with said overlying portion, said overlying portion being displaceable axially of said opening into engagement with said solenoid unit to manually actuate the latter, said resilient member including means engaging said mounting means and compressed between said mounting means and said one end of said housing for resiliently supporting and cushioning said solenoid unit in said housing.

7. A solenoid unit assembly comprising a housing having an opening at one end thereof, a solenoid unit contained within said housing having solenoid means and mounting means thereon including end portions for supporting said solenoid means within said housing and means for sealing said housing and manually actuating said solenoid unit including a one-piece, impervious, resilient member disposed in sealing engagement with said one end of said housing having an integral portion thereof overlying said opening, said opening being adapted to receive a manual actuating tool inserted therein and into engagement with said overlying portion, said overlying portion being displaceable axially of said opening into engagement with said solenoid unit to manually actuate the latter, said resilient member including means having grooves formed therein engaging said mounting means end portions, said resilient member being compressed between said end portions and said one end of said housing for resiliently supporting said solenoid unit in said housing in both generally axial and transverse directions with respect to said resilient member.

8. A solenoid unit assembly comprising a housing having an opening at one end thereof, a solenoid unit contained within said housing having a solenoid and mounting means thereon including end portions for supporting said solenoid means within said housing and means for sealing said housing and manually actuating said solenoid unit including a one-piece, impervious, resilient member disposed in sealing engagement with said one end of said housing having an integral portion thereof overlying said opening, said overlying portion having a wear resistant member supported thereon axially aligned with said opening, said opening being adapted to receive a manual actuating tool inserted therein and into engagement with said wear resistant member, said overlying portion being joined to said resilient member by an integral annular convolution and being displaceable axially of said opening into engagement with said solenoid unit to manually actuate the latter, said resilient member including grooves formed therein engaging said mounting means end portions, said resilient member being compressed between said end portions and said one end of said housing for resiliently supporting said solenoid unit in said housing in both generally axial and transverse directions with respect to said resilient member.

References Cited by the Examiner

UNITED STATES PATENTS

| | | | |
|---|---|---|---|
| 3,014,165 | 12/1961 | Koke | 317—165 |
| 3,056,421 | 10/1962 | Carls | 317—165 |
| 3,118,470 | 1/1964 | Peras | 251—130 X |

BERNARD A. GILHEANY, *Primary Examiner.*

JOHN F. BURNS, *Examiner.*